PATRICK KEANE.

Improvement in Self-acting Jack for Spinning.

No. 4,725. Reissued Jan. 30, 1872

Witnesses:

Chas. Nida

Wm. H. C. Smith.

Inventor:

P. Keane.

per

Munn & Co

Attorneys.

AM. PHOTO-LITHOGRAPHIC CO. N.Y. (OSBORNE'S PROCESS.)

UNITED STATES PATENT OFFICE.

PATRICK KEANE, OF COHOES, NEW YORK, ASSIGNOR TO HIMSELF AND SAMUEL BILBROUGH, OF SAME PLACE.

IMPROVEMENT IN SELF-ACTING JACKS FOR SPINNING.

Specification forming part of Letters Patent No. 117,893, dated August 8, 1871; reissue No. 4,725, dated January 30, 1872.

*To all whom it may concern:*

Be it known that I, PATRICK KEANE, of Cohoes, in the county of Albany and State of New York, have invented a new and useful Improvement in Self-Acting Spinning-Machines; and that the following is a full, clear, and exact description of the same, reference being had to the accompanying drawing making a part of this specification, in which—

Figure 1:
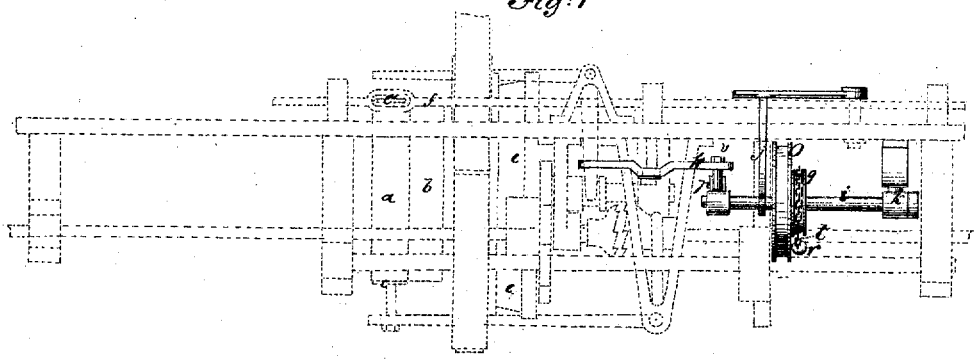
Figure 2:
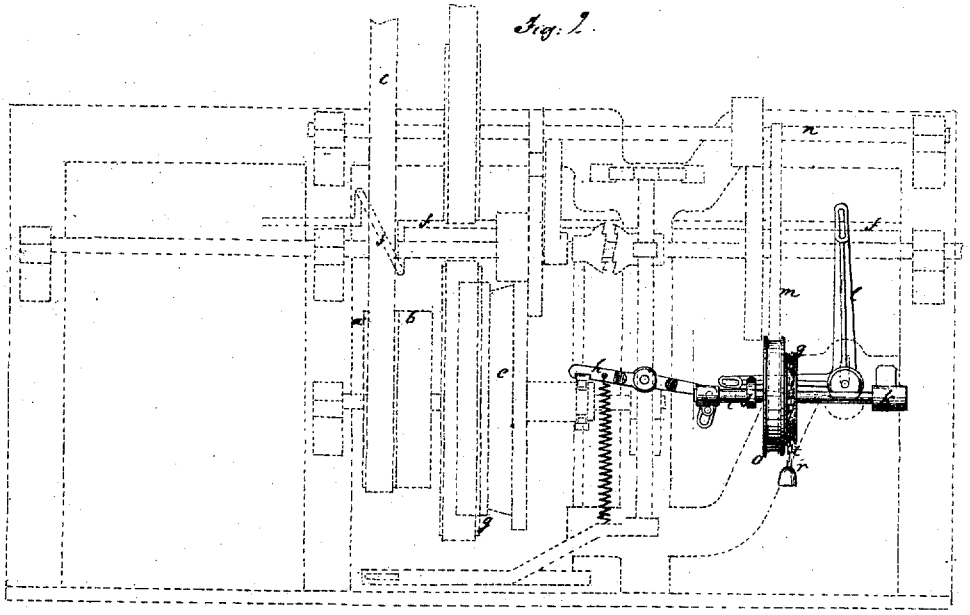
Figure 4:
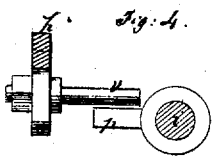
Figure 3:
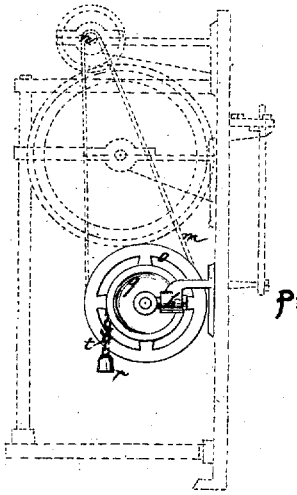

Figure 1 represents a top view of a part of a mule in dotted lines, with the portions which illustrate my invention shown in full lines. Fig. 2 represents a side elevation of the mechanism shown in Fig. 1. Fig. 3 represents an end elevation of the same; and Fig. 4 represents, on an enlarged scale, a section taken through the line *x x* of Fig. 2.

The object of this invention is to so construct, arrange, and operate certain mechanism in self-acting spinning-jacks as to avoid the great shocks and jars they are subject to when the clutch mechanism runs in before the belt is entirely shifted from the fast to the loose pulley, as in stopping and reversing the motion to effect the backing-off motion.

Self-acting spinning-machines, as constructed prior to my invention, were so arranged that the friction-clutch which gives the reverse motion for backing off takes hold before the belt which imparts the direct motion escapes from the driving-wheel, by which the two forces are brought into direct opposition and produce very severe jars or shocks, which, being repeated as often as each full operation of the machine takes place, cause great wear and damage to the machine. I am aware that means have been devised in self-acting mules to prevent the friction-clutch from moving too suddenly into action, and so producing jars and shocks to the machine from that cause. But my invention differs from this. My object is to hold back the friction-clutch, substantially as herein described, until the belt is entirely shifted from the fast to the loose pulley, but when the clutch starts it is not impeded by any extraordinary mechanism.

To enable others skilled in the art to make and use my invention, I will proceed to describe the same with reference to the drawing, in which—

*a* represents the loose pulley; *b*, the fast pulley; *c*, the driving-belt; *e*, the friction-cone; and *f*, the belt-shifter of a self-acting spinning-machine. The carriage is caused to run out by the direct action of the driving-belt *c*, and the backing off is effected by the friction-cone *e* when the driving-belt is shipped, and said cone is allowed to engage with the pulley *g* by being forced into contact with it by a spring concealed in the hub, or by other well-known means. As heretofore constructed, the trip-catch for holding the friction-cone out of contact with the pulley *g* while the driving-belt was at work on the fast pulley was so connected to the belt-shifting rod *f* that the cone was tripped at the instant the said rod was moved, so that the cone, being moved instantly by a spring, engaged the pulley *g* before the belt escaped from the fast pulley, whereby the two forces moving in different directions, acting on the same shaft at one and the same time, produced very great damage to the machine and work, besides wasting power. For the purpose of releasing the friction-cone by the action of the belt-shifter, and yet not doing it until the driving-belt has had time to escape entirely from the fast pulley, I arrange a shaft, *i*, in a swiveled bearing, *k*, at one end, and at the other end, supported in the end of an arm, *j*, a bell-crank lever, connected by its other arm, *l*, with the belt-shifter *f*, so that when the latter moves to throw off the belt it will allow the shaft *i* supported by it to drop and be set in motion by a belt, *m*, working on a shaft, *n*, above and around a large grooved or flanged pulley, *o*, on said shaft *i*, said belt being loose when shaft *i* is up, but tightened when the pulley *o* is let down so as to set said pulley in motion. The shaft *i* carries a tripper, *p*, at that end of it which is free to swing up and down, and it also carries a grooved pulley or drum, *q*, from which a weight, *r*, is suspended by a chain, *t*, for turning the shaft when freed from the action of the belt *m*, so that the tripper *p* will be held against the under side of the end of the trip-catch *h*, or of a pin, *v*, projecting from it, until the belt-shifter *f* moves and throws the end of the shaft *i* and the pulley *o* down, at the same time that it pushes the belt *c* toward the loose pulley. Then the pulley *o* will be set in motion, and turned until the tripper *p* comes around to the top of the pin *v* on the catch, and, pushing it down, releases the friction-cone after the belt has passed entirely off from the fast pulley. As the backing off is done very quickly, the belt-shifter goes back again, and frees the pulley *o* from the belt *m* before the weight *r* has been wound up to the pulley *q* and allows it to fall again, returning the tripper *p* to the under side of the pin *v*, ready for the next operation. The time allowed to elapse between the turning the drum-belt and the tripping of the friction-cone may be governed entirely by the size of the pulley *o*, which may be varied to suit the case in hand; or cone-pulleys may be employed for the purposes. The bell-crank for setting the tripping apparatus in gear, here represented as being actuated by the belt-shifter, may be actuated by any other device or part of the machine operating simultaneously with the shifter; but it is preferable to have it actuated by the belt-shifter, as here shown.

Having thus described my invention, what I claim is—

In a self-acting jack for spinning, the combination of a driving-pulley and a friction-clutch, both acting upon the same shaft to drive it in contrary directions at different times, a belt-shipper for moving the belt from the driving to the loose pulley, and a tripping and holding mechanism, substantially as described, interposed between the shipper and the clutch, the former being put into operative position by the shipper at the time the belt is being moved, for the purpose of releasing the device employed for holding back the clutch until the belt has passed entirely off of the driving-pulley, and then releasing it, allowing the cones to go into action, after which the trip mechanism returns by the reverse movement of the shipper into position for the next similar operation.

PATRICK KEANE.

Witnesses:

P. D. NIVER,

PATRICK KELLY.